US012756489B2

(12) United States Patent
Wang et al.

(10) Patent No.: US 12,756,489 B2
(45) Date of Patent: Oct. 6, 2026

(54) METHOD FOR CALCULATING SPATIAL NON-STATIONARY WIRELESS CHANNEL CAPACITY FOR LARGE-SCALE ANTENNA ARRAY COMMUNICATIONS

(71) Applicant: Southeast University, Nanjing (CN)

(72) Inventors: Chengxiang Wang, Nanjing (CN); Yue Yang, Nanjing (CN); Yi Zheng, Nanjing (CN); Jie Huang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 311 days.

(21) Appl. No.: 18/681,770

(22) PCT Filed: Apr. 12, 2023

(86) PCT No.: PCT/CN2023/087941
§ 371 (c)(1),
(2) Date: Feb. 6, 2024

(87) PCT Pub. No.: WO2023/165630
PCT Pub. Date: Sep. 7, 2023

(65) Prior Publication Data
US 2024/0340098 A1 Oct. 10, 2024

(30) Foreign Application Priority Data
Mar. 4, 2022 (CN) ......................... 202210208323.4

(51) Int. Cl.
*H04W 24/08* (2009.01)
*H04B 7/0413* (2017.01)
*H04B 17/391* (2015.01)

(52) U.S. Cl.
CPC ....... *H04B 17/3912* (2015.01); *H04B 7/0413* (2013.01)

(58) Field of Classification Search
CPC ..... H04L 25/0242; H04L 5/0023; H04B 7/04; H04B 17/3912; H04B 7/043;
(Continued)

(56) References Cited

U.S. PATENT DOCUMENTS

2005/0118958 A1* 6/2005 Alexiou .................. H04L 1/203 375/267
2018/0006741 A1* 1/2018 Schmidt ............ H04L 25/03343
2023/0387996 A1* 11/2023 Leather ................. H04W 72/51

FOREIGN PATENT DOCUMENTS

CN 107248877 A 10/2017
CN 113141202 A 7/2021
CN 114584237 A 6/2022

OTHER PUBLICATIONS

Lu, “Massive MIMO Channel Measurement and Modeling Study)”, (Doctoral Dissertations),Sep. 30, 2019 (Sep. 30, 2019),1, 141 pages.

* cited by examiner

*Primary Examiner* — Phuoc H Doan
(74) *Attorney, Agent, or Firm* — MUNCY, GEISSLER, OLDS & LOWE, P.C.

(57) ABSTRACT

A method for calculating the spatial non-stationary wireless channel capacity for large-scale antenna array communications, includes the following steps: first, constructing a spatial non-stationary channel model with a large-scale antenna array having the mutual coupling effect; building a channel measurement system for the large-scale antenna array, and obtaining measurement data; next, optimizing parameters of the channel model, and simulating the spatial cross-correlation function, then calculating the spatial stationary interval and calculating the channel capacity within the interval and the total channel capacity; and finally comparing simulation results with measurement results, to verify the correctness of the calculation method. The method
(Continued)

for calculating the channel capacity of a spatial non-stationary large-scale antenna array provided in the present invention can be effectively applied to a channel having non-stationary characteristics, thereby solving the limitation of Shannon channel capacity formula calculation.

5 Claims, 4 Drawing Sheets

(58) Field of Classification Search
CPC . H04B 7/0413; H04B 17/0087; H04W 24/10; H04W 72/51
See application file for complete search history.

METHOD FOR CALCULATING SPATIAL NON-STATIONARY WIRELESS CHANNEL CAPACITY FOR LARGE-SCALE ANTENNA ARRAY COMMUNICATIONS

TECHNICAL FIELD

The present disclosure relates to a technology for calculating a channel capacity for a non-stationary large-scale antenna array, and belongs to the technical field of wireless communication and channel modeling.

BACKGROUND

In order to achieve the objective of faster, farther, and larger capacity information transmission, the large-scale antenna array is regarded as one of the key technologies in the fifth generation of mobile communication systems (5G), which represents the spatial dimension of communication. The large-scale antenna array is more suitable for the sixth generation of mobile communication systems (6G), however with the number of antennas increases, the antenna array will be in the near-field region, which is defined by the Fresnel region of the array, including the distance below Rayleigh distance, i.e., $2L^2/\lambda$, where $\lambda$ and L denote the wavelength and maximum size of the antenna array, respectively. At this time, the spherical wavefront needs to be considered instead of the original previous plane wavefront. When the distance between antenna arrays is extremely close, the mutual coupling will be formed by the electromagnetic interaction between antenna elements, and the mutual coupling effect exhibits different performance in transmitting and receiving antenna arrays, which is basically not reflected in the previous channel model.

The Shannon channel capacity calculation formula is based on the assumption of wide-sense stationary signals, so it is not suitable for calculating the non-stationary channel capacity. The effect of non-stationary characteristics on the capacity of the multi-antenna channel model is not considered. In addition, the channel capacity is merely simulated in the previous study, with no measurement data for the real environment as support, resulting in a lack of verification. In order to calculate the capacity of the non-stationary channels more accurately, a new method for calculating the capacity needs to be proposed and the correctness of the new method can be verified.

SUMMARY

Technical problems: the objectives of the present disclosure are to provide a method suitable for calculating the capacity of a non-stationary channel through constructing a 6G non-stationary massive multiple-input multiple-output (MIMO) channel model, solve the limitation of the Shannon channel capacity formula in the non-stationary channel, and find the influence of the non-stationarity on the channel capacity.

Technical solutions: The complete technical means and methods of the present disclosure.

In order to realize the above objectives, the present disclosure provides a method for calculating the capacity of the non-stationary 6G massive MIMO channel. The method comprises the following specific steps.

In Step 1, a non-stationary channel model for a large-scale antenna array with the mutual coupling effect is constructed.

In Step 2, a channel measurement system for a large-scale antenna array is built to obtain measurement data.

In Step 3, simulation parameters for a channel with the large-scale antenna array are optimized, and the spatial cross-correlation function is simulated.

In Step 4, according to the spatial cross-correlation function, a spatial stationary interval is proposed and calculated.

In Step 5, according to the stationary interval, a channel capacity within the interval and a total channel capacity are calculated.

In Step 6, simulation results are compared with measurement results, to verify the correctness of the capacity calculation of the non-stationary channel.

The steps of Step 1 are specifically as follows.

In Step 101, the channel matrix $$H = [PL \cdot SH \cdot BL \cdot OL]^{\frac{1}{2}} \cdot H_s$$

for a non-stationary massive MIMO channel model is constructed, where PL denotes the path loss (PL), SH denotes the shadowing (SH) that follows a lognormal distribution, BL denotes the blockage loss (BL), and OL denotes the oxygen loss (OL). $H_s=[h_{qp}(t,\tau)]_{M_R \times M_T}$ denotes the small-scale fading matrix, where $M_R$ and $M_T$ denote the number of antennas at the receiving and transmitting terminal, respectively, and $h_{qp}(t, \tau)$ denotes the channel impulse response (CIR) between the p-th transmitting antenna and the q-th receiving antenna at a time instant t with a delay $\tau$. The CIR can be represented as a superposition of line-of-sight (LoS) and non-line-of-sight (NLoS) components:

$$h_{qp}(t, \tau) = \sqrt{\frac{K_R}{K_R+1}} h_{qp}^L(t, \tau) + \sqrt{\frac{1}{K_R+1}} h_{qp}^N(t, \tau)$$

where $K_R$ denotes a rice factor, the NLOS components $$h_{qp}^N(t, \tau)$$

are calculated by the following formula:

$$h_{qp}^N(t, \tau) = \sum_{n=1}^{N_{qp}(t)} \sum_{m=1}^{M_n} F_r^T \cdot M \cdot F_t \cdot \sqrt{P_{qp,m_n}(t)} \cdot e^{j2\pi f_c \tau_{qp,m_n}(t)} \cdot \delta(\tau - \tau_{qp,m_n}(t))$$

where $\{\cdot\}^T$ denotes the transposition operator, the carrier frequency is represented as $f_c$, $P_{qp,m_n}(t)$ and $\tau_{qp,m_n}(t)$ denote the power and delay of the m-th ray from the p-th transmitting antenna to the q-th receiving antenna at the time instant t, respectively, $N_{qp}(t)$ and $M_n$ denote a total number of clusters and rays in the clusters, respectively. Polarization matrixes $F_r$ and $F_t$ contain vertical and horizontal polarizations of the antennas at the receiving and transmitting terminal, respectively. The variation of antenna polarization along a propagation path is represented as M.

In Step 102, the spherical wavefront is modeled. According to the geometry relationship as illustrated in FIG. 3, it can be seen that the length of the antenna at the transmitting terminal is $$l_p^T.$$

At the time instant t, the distance $$d^T_{p,m_n}(t)$$

between the transmitting terminal and the n-th cluster through the m-th ray is represented as:

$$d^T_{p,m_n}(t) = d^T_{m_n} - \left[ l^T_p + \int_0^t v^T(t) - v^{A_n}(t)dt \right]$$

where $$d^T_{m_n}$$

denotes a distance vector from the first transmitting antenna to the first cluster on the n-th path through the m-th ray at an initial time, $v^T(t)$ and $v^{A_n}(t)$ denote the moving speed of the transmitting terminal and the moving speed of the first cluster on the n-th path at time t, respectively.

A relationship in spherical coordinate systems is as follows:

$$d^T_{m_n} = d^T_{m_n} \begin{bmatrix} \cos(\phi^T_{E,m_n})\cos(\phi^T_{A,m_n}) \\ \cos(\phi^T_{E,m_n})\sin(\phi^T_{A,m_n}) \\ \sin(\phi^T_{E,m_n}) \end{bmatrix}^T$$

$$l^T_p = \delta_p \begin{bmatrix} \cos(\beta^T_E)\cos(\beta^T_A) \\ \cos(\beta^T_E)\sin(\beta^T_A) \\ \sin(\beta^T_E)] \end{bmatrix}^T$$

$$v^T(t) = v^T(t) \begin{bmatrix} \cos(\alpha^T_E(t))\cos(\alpha^T_A(t)) \\ \cos(\alpha^T_E(t))\sin(\alpha^T_A(t)) \\ \sin(\alpha^T_E(t)) \end{bmatrix}^T$$

$$v^{A_n}(t) = v^{A_n}(t) \begin{bmatrix} \cos(\alpha^{A_n}_E(t))\cos(\alpha^{A_n}_A(t)) \\ \cos(\alpha^{A_n}_E(t))\sin(\alpha^{A_n}_A(t)) \\ \sin(\alpha^{A_n}_E(t))] \end{bmatrix}^T$$

where $$\phi^T_{E,m_n} \text{ and } \phi^T_{A,m_n}$$

denote the elevation angle of departure and azimuth angle of departure of the m-th ray in the n-th cluster, respectively, $\delta_p$ denotes the distance between the first antenna to the p-th antenna at the transmitting terminal, $$\beta^T_E \text{ and } \beta^T_A$$

denote the elevation angle and azimuth angle of the antenna array at the transmitting terminal, respectively, $$\alpha^T_E(t) \text{ and } \alpha^T_A(t)$$

denote the elevation angle and azimuth angle of the moving transmitting terminal at the time instant t, respectively, $$\alpha^{A_n}_E(t) \text{ and } \alpha^{A_n}_A(t)$$

denote the movable elevation angle and azimuth angle of the first cluster on the n-th path, respectively. The approximate result of $$d^T_{p,m_n}(t)$$

is eventually obtained as follows:

$$d^T_{p,m_n}(t) \approx d^T_{m_n} - \cos(\omega^T_p)v^T t - \cos(\vartheta^T)\delta_p + \frac{\sin^2(\vartheta^T)\delta_p^2}{2d^T_{m_n}} + \frac{\sin^2(\omega^T_p)(v^T t)^2}{2[d^T_{m_n} - \cos(\vartheta^T)\delta_p]}$$

where $\vartheta^T$ denotes the angle between the transmitting antenna array and the m-th ray, and $$\omega^T_p$$

denotes the angle between the scatterer $$S^A_{m_n}$$

and the transmitting antenna, the $\vartheta^T$ and the $$\omega^T_p$$

are represented as following formulas, respectively:

$$\cos(\vartheta^T) = \cos(\phi^T_{E,m_n})\cos(\beta^T_E) \,\&\, \cos(\beta^T_A - \phi^T_{A,m_n}) + \sin(\phi^T_{E,m_n})\sin(\beta^T_E)$$

$$\cos(\omega^T_p) = \frac{d^T_{m_n}\cos(\alpha^T - \phi^T_{A,m_n})\cos(\phi^T_{E,m_n}) - \delta_p\cos(\alpha^T - \beta^T_A)\cos(\beta^T_E)}{\left[(d^T_{m_n})^2 - 2d^T_{m_n}\delta_p\cos(\vartheta^T) + \delta_p^2\right]^{1/2}}$$

for the receiving terminal, the $$d^T_{p,m_n}(t), \vartheta^T, \text{ and } \omega^T_p$$

in the above formula merely need to be replaced by $$d^R_{q,m_n}(t), \vartheta^R, \text{ and } \omega^R_q,$$

respectively.

In Step 103, an evolution on an array axis is modeled. Generations and disappearances of clusters are characterized by utilizing the birth-death process in the present disclosure, and for the transmitting terminal, the survival probability of the cluster on the array axis is calculated by the following equation:

$$P_{sur}^{T}(\delta_p) = \exp^{-\lambda_R \cdot \frac{\delta_p \cos \beta_E^T}{D_c^A}}$$

where $\lambda_R$ denotes the disappearance rate of the cluster, $$D_c^A$$

denotes a scenario-dependent coefficient in the spatial domain. Similarly, the survival probability at the receiving terminal is:

$$P_{sur}^{R}(\delta_q) = \exp^{-\lambda_R \cdot \frac{\delta_q \cos \beta_E^R}{D_c^A}}$$

where $\delta_q$ denotes the distance from the first antenna to the q-th antenna at the receiving terminal. Therefore, the number of newly generated clusters generated by the spatial evolution is represented as:

$$E[N_{new}] = \frac{\lambda_G}{\lambda_R}(1 - P_{sur}(\delta_p, \delta_q))$$

where $\lambda_G$ denotes the generation rate of the clusters.

In Step 104, the mutual coupling effect between antennas is modeled. The antenna radiation pattern is affected by the mutual coupling because the distance between antennas in the massive MIMO channel is extremely short. The impedance matrix is utilized in the present disclosure to describe the mutual coupling between antennas, and the complete communication system is referred to FIG. 4. The multi-port model is obtained by correlating antenna currents and antenna voltages with port currents and port voltages:

$$\begin{bmatrix} u_1 \\ u_2 \end{bmatrix} = \begin{bmatrix} Z_{11} & Z_{12} \\ Z_{21} & Z_{22} \end{bmatrix} \begin{bmatrix} i_1 \\ i_2 \end{bmatrix}$$

where $u_1$, $i_1$ denote port voltages and port currents at the transmitting terminal, respectively and $u_2$, $i_2$ denote port voltages and port currents at the receiving terminal, respectively, $Z_{11}$, $Z_{22}$ denote a transmitting impedance matrix and a receiving impedance matrix respectively, and $Z_{12}$, $Z_{21}$ denote mutual impedance matrixes.

When a uniform linear array of isotropic antennas is considered, the mutual coupling effect considering an input and a load impedance is represented as:

$$c_p = (Z_G + Z_L)(Z + Z_L I)^{-1}$$

where $Z_G$ denotes an input impedance of an element in a free space, and $Z_L$ is a matched load impedance. The current vector is represented as I and the matrix Z can be extended to:

$$[Z] = \begin{bmatrix} Z_G + Z_L & Z_{12} & \cdots & Z_{1q} \\ Z_{12} & Z_G + Z_L & \cdots & Z_{2q} \\ \vdots & \vdots & \ddots & \vdots \\ Z_{q1} & Z_{q2} & \cdots & Z_G + Z_L \end{bmatrix}$$

therefore, the channel matrix after adding the mutual coupling effect can be represented as:

$$G = c_p^{R^{-1/2}} \cdot H \cdot c_p^{T^{-1/2}}$$

where $$c_p^R \text{ and } c_p^T$$

denote coupling matrixes of the receiving terminal and transmitting terminal, respectively.

The massive MIMO channel measurement system constructed in Step 2 can be referred to FIG. 5.

The steps of Step 4 are specifically as follows.

In Step 401, for the channel capacity studied in the present disclosure, a circumstance when channel state information (CSI) is unknown at the transmitting terminal, the CSI is completely known at the receiving terminal and the channel matrix is random can be adopted:

$$C = E\left\{\log_2 \det\left(I + \frac{\rho}{M_T} HH^H\right)\right\}$$

where ρ denotes the signal-to-noise ratio (SNR), and H denotes the channel matrix.

In Step 402, the spatial stationary interval is defined and calculated according to the spatial cross-correlation function.

The estimated period can be measured by the stationary interval, during which the channel amplitude response can be considered to be wide-sense stationary. The definition of time-domain stationary interval can be analogized, which is the maximum time length when the autocorrelation function of the delay power spectral density exceeds 80% of a threshold, where 80% of the threshold is an empirical value that can be adjusted as needed. After analogy, the definition of spatial stationary interval is proposed, which is the maximum number of antennas when the spatial cross-correlation function of angular power spectral density exceeds 80% of the threshold. Therefore, an improvement of a stationary interval I(r) in space s is defined as:

$$I(r) = \inf\{\Delta r \mid R_\Lambda(r, \Delta r) \le 0.8\}$$

where inf{·} denotes an infimum of the function, Δr denotes a number of antennas in the spatial stationary interval, and $R_\Lambda(r, \Delta r)$ denotes a normalized spatial cross-correlation function of the angular power spectral density:

$$R_\Lambda(r, \Delta r) = \frac{\int \Lambda(r, \varpi)\Lambda(r + \Delta r, \varpi)d\varpi}{\max\left\{\int \Lambda^2(r, \varpi)d\varpi, \int \Lambda^2(r + \Delta r, \varpi)d\varpi\right\}}$$

where $\varpi$ denotes the angle difference.

The steps of Step 5 are specifically: firstly, according to the stationary interval obtained in the Step 4, the channel is divided into n segments, and according to a stationary interval $\Delta r_i$ at an i-th segment, the channel capacity of the i-th segment is calculated as follows:

$$C_{\Delta r_i} = E\left\{\log_2 \det\left(I + \frac{\rho}{M_T} G_i G_i^H\right)\right\}$$

where $G_i$ denotes the general channel matrix at the i-th segment.

Eventually, a total channel capacity in an entire observation interval R is obtained as follows:

$$C = \sum_{i=1}^{n} \frac{\Delta r_i}{R} C_{\Delta r_i} = \sum_{i=1}^{n} \frac{\Delta r_i}{R} E\left\{\log_2 \det\left(I + \frac{\rho}{M_T} G_i G_i^H\right)\right\}.$$

The specific contents of Step 6 are to compare the simulation model in Step 1 with the measurement data obtained in Step 2 to eventually verify the correctness of the proposed channel capacity calculation formula.

Beneficial effects: the benefits and targets achieved by the present disclosure are as follows.

The non-stationary characteristics and mutual coupling effects of massive MIMO are introduced on the basis of traditional wireless channel modeling in the present disclosure, and a novel method for calculating the non-stationary channel capacity is proposed. Since the unique massive MIMO channel measurement system, the verification on the accuracy of the model and the calculation method can be supported in the present disclosure, and the problem that the Shannon channel capacity formula is not applicable in the non-stationary channel can be solved. In addition, compared with other channel models, the channel model proposed by the present disclosure is more consistent with the real communication scenario, the accuracy of the channel model can be verified by the channel measurement system, and the channel capacity calculation formula proposed by the present disclosure has the characteristics of low complexity.

DETAILED DESCRIPTION OF THE EMBODIMENTS

The following is a detailed description of the present disclosure in conjunction with the drawings and specific embodiments. This embodiment 1 is implemented on the premise of the technical solutions in the present disclosure, and provides a detailed implementation and a specific operation process, but the protection scope of the present disclosure is not limited to the following embodiments.

The examples are given according to the contents included in the claims.

Embodiment 1

Figure 1:
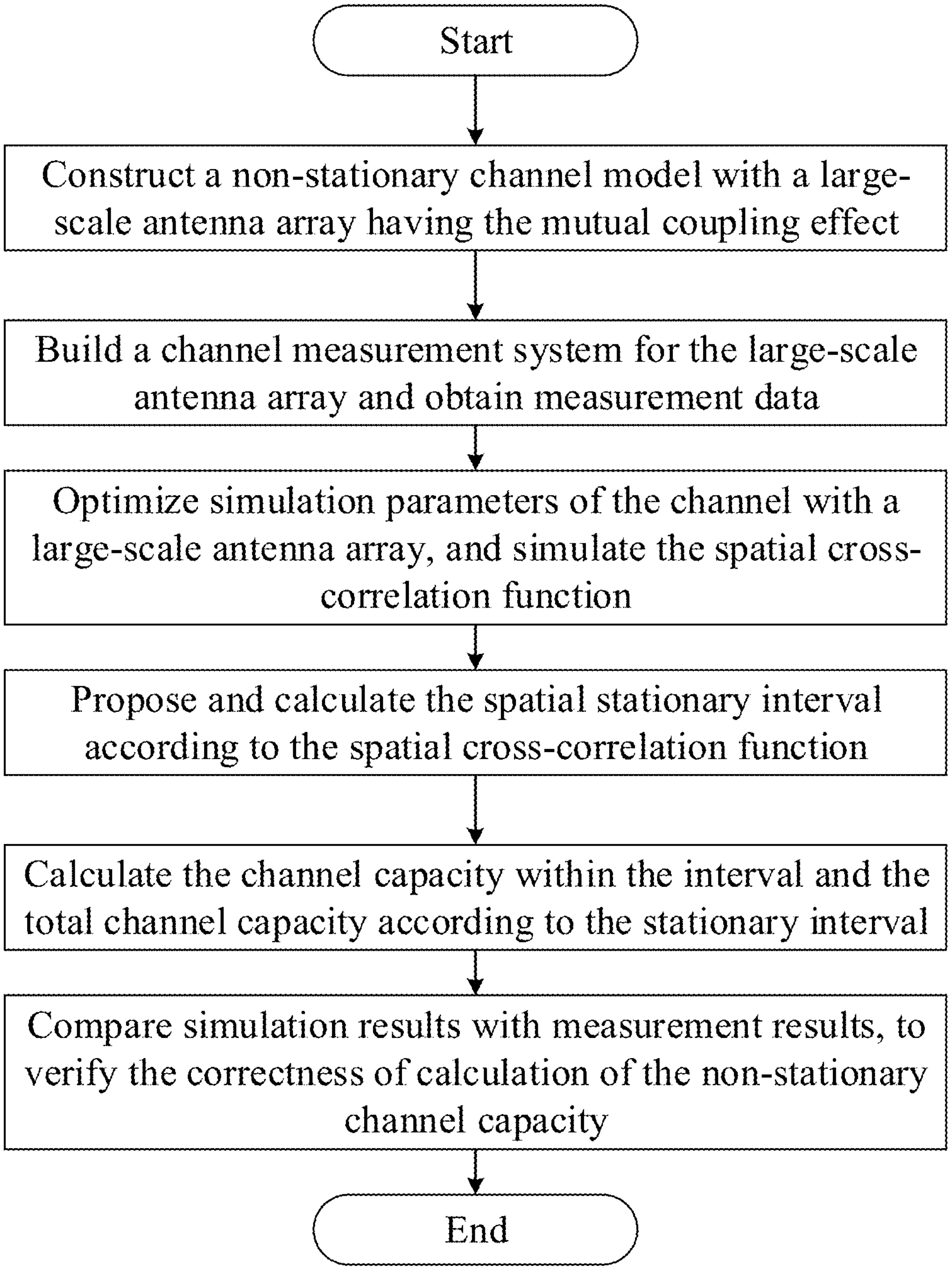
FIG. 1 illustrates a flow diagram of the present disclosure.
Figure 2:
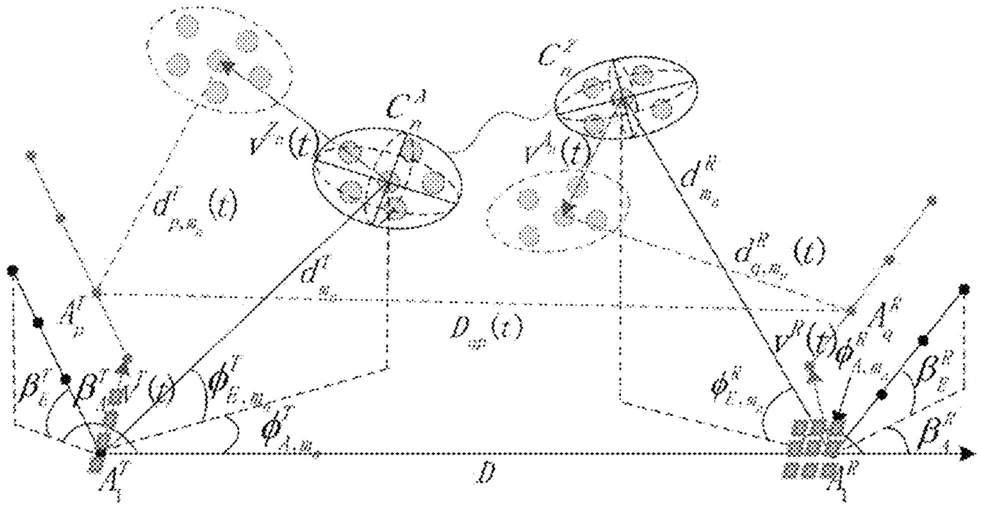
FIG. 2 illustrates a schematic diagram of a 3D massive MIMO channel model constructed in the present disclosure.

As illustrated in FIG. 2, in a typical massive MIMO communication scenario, the channel exhibits different characteristics according to different antenna settings at the receiving terminal and the transmitting terminal. The geometric random model for the massive MIMO channel scenario is presented herein by taking the transmitting terminal as a uniform linear array and the receiving terminal as a uniform planar array. To accurately calculate the capacity of the above channel model, the present disclosure provides a method for calculating the channel capacity for the non-stationary large-scale antenna array, as illustrated in FIG. 1, which specifically includes the following steps.

In Step 1, a non-stationary channel model for a large-scale antenna array with the mutual coupling effect is constructed.

In Step 2, a channel measurement system for a large-scale antenna array is built to obtain measurement data.

In Step 3, simulation parameters for a channel of the large-scale antenna array are optimized, and the spatial cross-correlation function is simulated.

In Step 4, according to the spatial cross-correlation function, a spatial stationary interval is proposed and calculated.

In Step 5, according to the stationary interval, a channel capacity within the interval and a total channel are calculated.

In Step 6, simulation results are compared with measurement results, to verify the correctness of the capacity calculation of the non-stationary channel.

The steps of Step 1 are specifically as follows.

In Step 101, the channel matrix $$H = [PL \cdot SH \cdot BL \cdot OL]^{\frac{1}{2}} \cdot H_s$$

for a non-stationary massive MIMO channel is constructed, where PL denotes the path loss, SH denotes the shadowing that follows a lognormal distribution, BL denotes the blockage loss, and OL denotes the oxygen loss. $H_s=[h_{qp}(t, \tau)]_{M_R \times M_T}$ denotes the small-scale fading matrix, where $M_R$ and $M_T$ denote the number of antennas at the receiving and transmitting terminal, respectively, and $h_{qp}(t, \tau)$ denotes the CIR between the p-th transmitting antenna and the q-th receiving antenna at a time instant t with a delay $\tau$. The CIR can be represented as a superposition of LoS and NLOS components:

$$h_{qp}(t,\tau)=\sqrt{\frac{K_R}{K_R+1}}h_{qp}^L(t,\tau)+\sqrt{\frac{1}{K_R+1}}h_{qp}^N(t,\tau),$$

where $K_R$ denotes a rice factor, the NLOS components $$h_{qp}^N(t,\tau)$$

are calculated by the following formula:

$$h_{qp}^N(t,\tau)=\sum_{n=1}^{N_{qp}(t)}\sum_{m=1}^{M_n}F_r^T\cdot M\cdot F_t\cdot\sqrt{P_{qp,m_n}(t)}\cdot e^{j2\pi f_c\tau_{qp,m_n}(t)}\cdot\delta(\tau-\tau_{qp,m_n}(t)),$$

where $\{\cdot\}^T$ denotes the transposition operator, the carrier frequency is represented as $f_c$, $P_{qp,m_n}(t)$ and $\tau_{qp,m_n}(t)$ denote the power and delay of the m-th ray from the p-th transmitting antenna to the q-th receiving antenna at the time instant t, respectively, $N_{qp}(t)$ and $M_n$ denote the total number of clusters and rays in the clusters, respectively. Polarization matrixes $F_r$ and $F_t$ contain vertical and horizontal polarizations of the antennas at the receiving and transmitting terminal, respectively. The variation of antenna polarization along a propagation path is represented as M.

Figure 3:
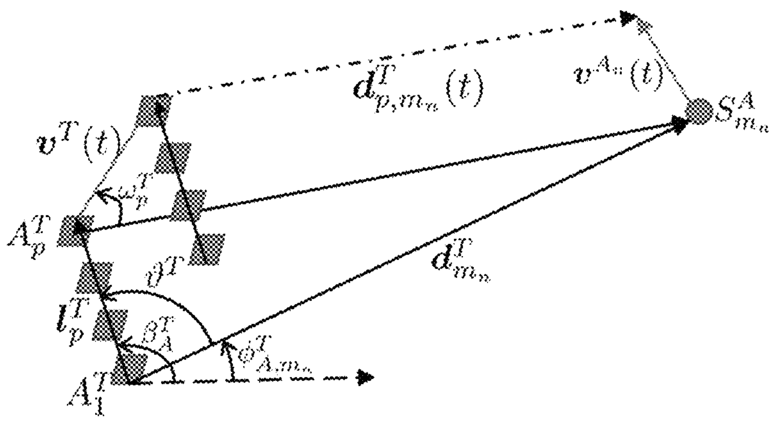
FIG. 3 illustrates a schematic diagram of a distance geometry relationship in the channel model of the present disclosure.

In Step 102, the spherical wavefront is modeled. According to the geometry relationship as illustrated in FIG. 3, it can be seen that the length of the antenna at the transmitting terminal is $$l_p^T.$$

At the time instant t, the distance $$d_{p,m_n}^T(t)$$

between the transmitting terminal and the n-th cluster through the m-th ray is represented as:

$$d_{p,m_n}^T(t)=d_{m_n}^T-\left[l_p^T+\int_0^t v^T(t)-v^{A_n}(t)dt\right],$$

where $$d_{m_n}^T$$

denotes a distance vector from the first transmitting antenna to the first cluster on the n-th path through the m-th ray at an initial time, $v^T(t)$ and $v^{A_n}(t)$ denote the moving speeds of the transmitting terminal and the first cluster on the n-th path at time t, respectively.

A relationship in spherical coordinate systems is as follows:

$$d_{m_n}^T=d_{m_n}^T\begin{bmatrix}\cos(\phi_{E,m_n}^T)\cos(\phi_{A,m_n}^T)\\\cos(\phi_{E,m_n}^T)\sin(\phi_{A,m_n}^T)\\\sin(\phi_{E,m_n}^T)\end{bmatrix}^T$$

$$l_p^T=\delta_p\begin{bmatrix}\cos(\beta_E^T)\cos(\beta_A^T)\\\cos(\beta_E^T)\sin(\beta_A^T)\\\sin(\beta_E^T)\end{bmatrix}^T$$

$$v^T(t)=v^T(t)\begin{bmatrix}\cos(\alpha_E^T(t))\cos(\alpha_A^T(t))\\\cos(\alpha_E^T(t))\sin(\alpha_A^T(t))\\\sin(\alpha_E^T(t))\end{bmatrix}^T$$

$$v^{A_n}(t)=v^{A_n}(t)\begin{bmatrix}\cos(\alpha_E^{A_n}(t))\cos(\alpha_A^{A_n}(t))\\\cos(\alpha_E^{A_n}(t))\sin(\alpha_E^{A_n}(t))\\\sin(\alpha_E^{A_n}(t))]\end{bmatrix}^T,$$

where $$\phi_{E,m_n}^T \text{ and } \phi_{A,m_n}^T$$

denote the elevation angle of departure and azimuth angle of departure of the m-th ray in the n-th cluster, respectively, $\delta_p$ denotes the distance between the first antenna to the p-th antenna at the transmitting terminal, $$\beta_E^T \text{ and } \beta_A^T$$

denote the elevation angle and azimuth angle of the antenna array at the transmitting terminal, respectively, $$\alpha_E^T(t) \text{ and } \alpha_A^T(t)$$

denote the elevation angle and azimuth angle of the moving transmitting terminal at the time instant t, respectively, $$\alpha_E^{A_n}(t) \text{ and } \alpha_A^{A_n}(t)$$

denote the movable elevation angle and azimuth angle of the first cluster on the n-th path, respectively. The approximate result of $$d_{p,m_n}^T(t)$$

is eventually obtained as follows:

$$d_{p,m_n}^T(t)\approx d_{m_n}^T-\cos(\omega_p^T)v^Tt-\cos(\vartheta^T)\delta_p+\frac{\sin^2(\vartheta^T)\delta_p^2}{2d_{m_n}^T}+\frac{\sin^2(\omega_p^T)(v^Tt)^2}{2[d_{m_n}^T-\cos(\vartheta^T)\delta_p]},$$

where $\vartheta^T$ denotes the angle between the transmitting antenna array and the m-th ray, and $$\omega_p^T$$

denotes the angle between the scatterer $$S_{m_n}^A$$

and the transmitting antenna, the $\vartheta^T$ and the $$\omega_p^T$$

are respectively represented as following formulas, respectively:

$$\cos(\vartheta^T) = \cos(\phi_{E,m_n}^T)\cos(\beta_E^T) \,\&\, \cos(\beta_A^T - \phi_{A,m_n}^T) + \sin(\phi_{E,m_n}^T)\sin(\beta_E^T)$$

$$\cos(\omega_p^T) = \frac{d_{m_n}^T \cos(\alpha^T - \phi_{A,m_n}^T)\cos(\phi_{E,m_n}^T) - \delta_p \cos(\alpha^T - \beta_A^T)\cos(\beta_E^T)}{\left[(d_{m_n}^T)^2 - 2d_{m_n}^T \delta_p \cos(\vartheta^T) + \delta_p^2\right]^{1/2}},$$

for the receiving terminal, the $$d_{p,m_n}^T(t),\ \vartheta^T,\ \text{and}\ \omega_p^T$$

in the above formula merely need to be replaced by $$d_{q,m_n}^R(t),\ \vartheta^R,\ \text{and}\ \omega_q^R,$$

respectively.

In Step 103, an evolution on an array axis is modeled. Generations and disappearances of clusters are characterized by utilizing the birth-death process in the present disclosure, and for the transmitting terminal, the survival probability of the cluster on the array axis is calculated by the following equation:

$$P_{sur}^T(\delta_p) = \exp^{-\lambda_R \cdot \frac{\delta_p \cos \beta_E^T}{D_c^A}},$$

where $\lambda_R$ denotes the disappearance rate of the cluster, $$D_c^A$$

denotes a scenario-dependent coefficient in the spatial domain. Similarly, the survival probability at the receiving terminal is:

$$P_{sur}^R(\delta_q) = \exp^{-\lambda_R \cdot \frac{\delta_q \cos \beta_E^R}{D_c^A}},$$

where $\delta_q$ denotes the distance from the first antenna to the q-th antenna at the receiving terminal. Therefore, the number of newly generated clusters generated by the spatial evolution is represented as:

$$E[N_{new}] = \frac{\lambda_G}{\lambda_R}(1 - P_{sur}(\delta_p, \delta_q)),$$

where $\lambda_G$ denotes the generation rate of the clusters.

Figure 4:
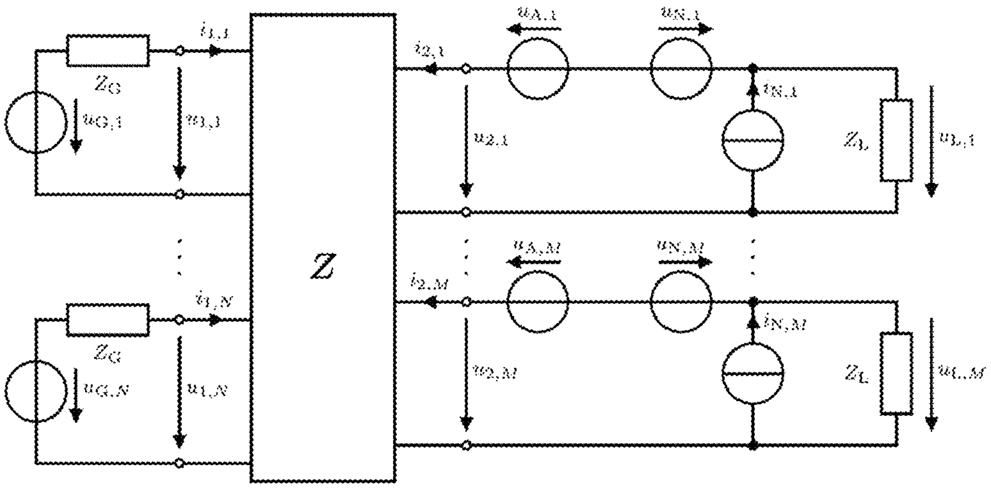
FIG. 4 illustrates a schematic diagram of an antenna mutual coupling effect added into the channel model of the present disclosure.

In Step 104, the mutual coupling effect between antennas is modeled. The antenna radiation pattern is affected by the mutual coupling because the distance between antennas in the massive MIMO channel is extremely short. The impedance matrix is utilized in the present disclosure to describe the mutual coupling between antennas, and the complete communication system is referred to FIG. 4. The multi-port model is obtained by correlating antenna currents and antenna voltages with port currents and port voltages:

$$\begin{bmatrix} u_1 \\ u_2 \end{bmatrix} = \begin{bmatrix} Z_{11} & Z_{12} \\ Z_{21} & Z_{22} \end{bmatrix} \begin{bmatrix} i_1 \\ i_2 \end{bmatrix}.$$

When a uniform linear array of isotropic antennas is considered, the mutual coupling effect considering an input and a load impedance is represented as:

$$c_p = (Z_G + Z_L)(Z + Z_L I)^{-1},$$

where $Z_G$ denotes an input impedance of an element in a free space, and $Z_L$ is a matched load impedance. The current vector is represented as I and the matrix Z can be extended to:

$$[Z] = \begin{bmatrix} Z_G + Z_L & Z_{12} & \dots & Z_{1q} \\ Z_{12} & Z_G + Z_L & \dots & Z_{2q} \\ \vdots & \vdots & \ddots & \vdots \\ Z_{q1} & Z_{q2} & \dots & Z_G + Z_L \end{bmatrix},$$

therefore, the channel matrix after adding the mutual coupling effect can be represented as:

$$G = c_p^{R^{-1/2}} \cdot H \cdot c_p^{T^{-1/2}},$$

where $$c_p^R \text{ and } c_p^T$$

denote coupling matrixes of the receiving terminal and transmitting terminal, respectively. Eventually, the channel matrix with mutual coupling effect is obtained.

Figure 5:
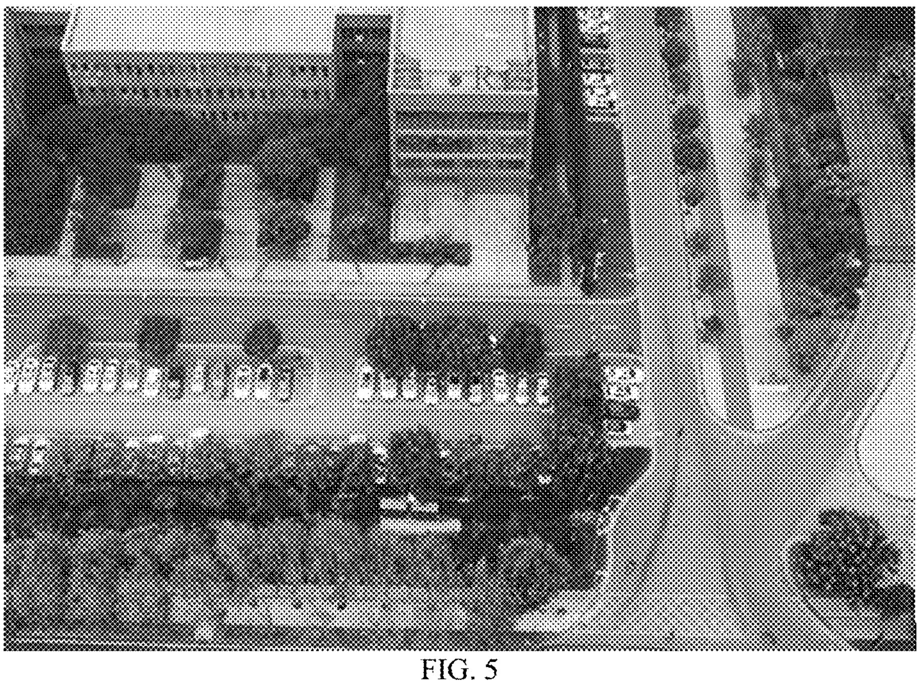
FIG. 5 illustrates a schematic diagram of a channel measurement environment in the present disclosure.
Figure 6:
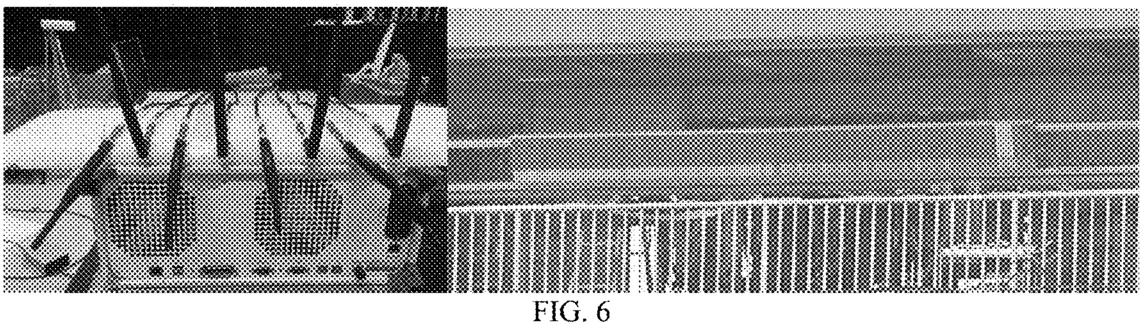
FIG. 6 illustrates a schematic diagram of an antenna configuration of a transmitting terminal and a receiving terminal in the embodiments of the present disclosure.

The massive MIMO channel measurement system constructed in Step 2 can be referred to FIG. 5. Demonstrated in this embodiment is the massive MIMO channel measurement work carried out by the China Network Valley in Nanjing, Jiangsu Province, China, in which a 5.3 GHz band and an extremely massive MIMO system with a 160 MHz bandwidth are used. The size of array at the receiving terminal is 4.3136 m×0.361 m, the space between antenna units is 0.5955 wavelength, the transmitting terminal has eight omnidirectional antennas, and the space between antenna units is 0.88 wavelength, the design of antennas at the transmitting terminal and the receiving terminal can be referred to FIG. 6. The measurement steps are specifically as follows. Firstly, the transmitter is turned on and the control software at the transmitting terminal is set for transmitting signals. The control software at the receiving terminal is set at the receiving terminal. Data are ensured to be collected at correct position points by the transmitting terminal and receiving terminal through interphones. Secondly, the transmitter is moved to the first point on Route 1 for measurement, and then proceed to the second point in sequence . . . as well as the first point on Route 2, the second point on Route 2 . . . until the last point on Route 4. The GPS antenna is followed for movement and the accuracy of the rubidium clock is ensured during the measurement process. The data collection time at each measurement point is set to be 5 seconds (the data volume of the corresponding receiving terminal is approximately 16384 MB). Eventually, the channel impulse response of the 8×128 antenna array in the static scenario is obtained, which is the basis for the subsequent research on channel capacity.

Figure 7:
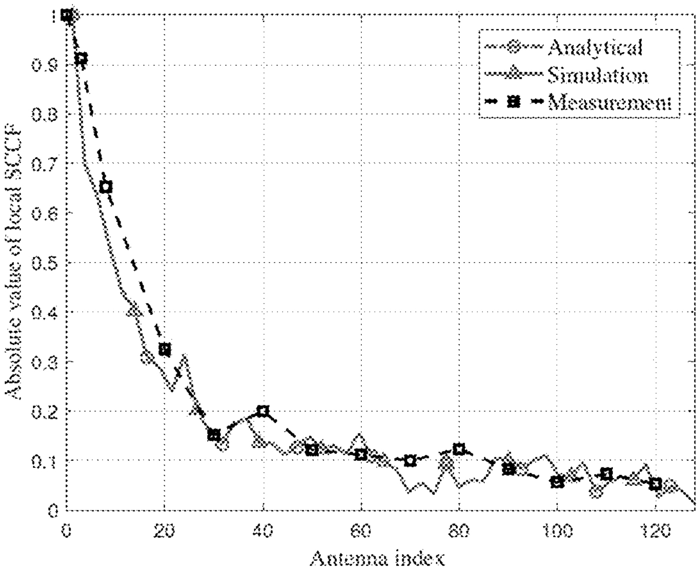
FIG. 7 illustrates a schematic diagram of a result of a channel spatial cross-correlation function in the embodiments of the present disclosure.

As illustrated in FIG. 7, the spatial cross-correlation function of the channel can be calculated in Step 3 after the optimization of the simulation parameters, through the measurement data obtained in Step 2.

The steps of Step 4 are specifically as follows.

In Step 401, for the channel capacity studied in the present disclosure, a circumstance when CSI is unknown at the transmitting terminal, the CSI is completely known at the receiving terminal and the channel matrix is random can be adopted:

$$C = E\left\{\log_2 \det\left(I + \frac{\rho}{M_T} HH^H\right)\right\}$$

where ρ denotes the signal-to-noise ratio (SNR), and H denotes the channel matrix.

In Step 402, the spatial domain stationary interval is defined and calculated according to the spatial cross-correlation function.

The estimated period can be measured by the stationary interval, during which the channel amplitude response can be considered to be wide-sense stationary. The definition of time-domain stationary interval can be analogized, which is the maximum time length when the autocorrelation function of the delay power spectral density exceeds 80% of a threshold, where 80% of the threshold is an empirical value that can be adjusted as needed. After analogy, the definition of spatial stationary interval is proposed, which is the maximum number of antennas when spatial cross-correlation function of angular power spectral density exceeds 80% of the threshold. Therefore, an improvement of a stationary interval I(r) in space s is defined as:

$$I(r) = inf\{\Delta r \mid R_\Lambda(r, \Delta r) \le 0.8\}$$

where inf{·} denotes an infimum of the function, Δr denotes a number of antennas in the spatial stationary interval, and $R_\Lambda(r, \Delta r)$ denotes a normalized spatial cross-correlation function of the angular power spectral density:

$$R_\Lambda(r, \Delta r) = \frac{\int \Lambda(r, \varpi)\Lambda(r + \Delta r, \varpi)d\varpi}{\max\left\{\int \Lambda^2(r, \varpi)d\varpi, \int \Lambda^2(r + \Delta r, \varpi)d\varpi\right\}}$$

where $\overline{\omega}$ denotes the angle difference. The spatial stationary interval calculated according to the above formula is approximately 6 adjacent antennas. Therefore, 6 adjacent antennas are taken as one group to solve the channel capacity in segments, and eventually the total channel capacity is obtained.

The steps of Step 5 are specifically: Firstly, according to the stationary interval obtained in Step 4, the channel is divided into n segments, and according to a stationary interval $\Delta r_i$ at an i-th segment, the channel capacity of the i-th segment is calculated as follows:

$$C_{\Delta r_i} = E\left\{\log_2 \det\left(I + \frac{\rho}{M_T} G_i G_i^H\right)\right\}.$$

Eventually, a total channel capacity in an entire observation interval R is obtained as follows:

$$C = \sum_{i=1}^{n} \frac{\Delta r_i}{R} C_{\Delta r_i} = \sum_{i=1}^{n} \frac{\Delta r_i}{R} E\left\{\log_2 \det\left(I + \frac{\rho}{M_T} G_i G_i^H\right)\right\}.$$

Figure 8:
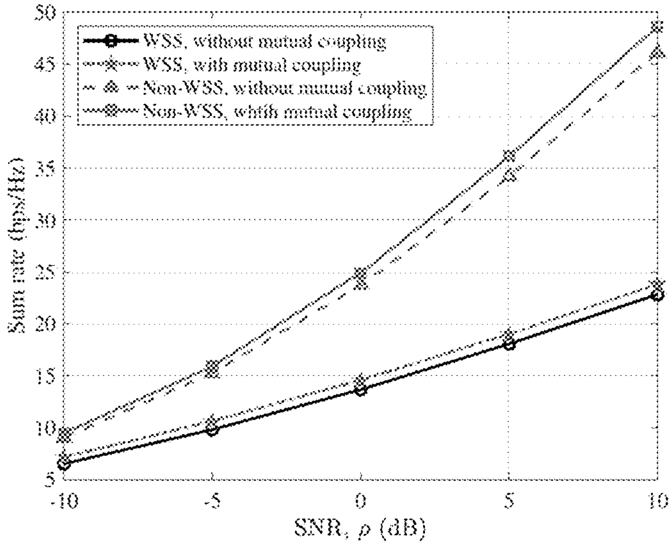
FIG. 8 illustrates a schematic diagram of a comparison result of a channel capacity between a stationary channel and a non-stationary channel in the embodiments of the present disclosure.

The schematic diagram of the capacity comparison between the stationary channel and the non-stationary channel eventually obtained is as illustrated in FIG. 8. It can be seen that the capacity of the non-stationary channel is approximately twice that of the stationary channel, and the capacity is increased by approximately 2 bps/Hz due to the addition of mutual coupling.

Figure 9:
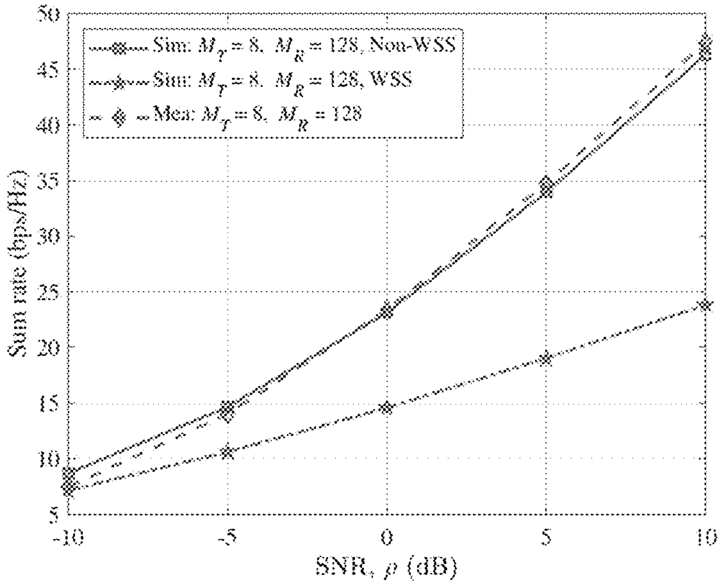
FIG. 9 illustrates a schematic diagram of the comparison result of the channel capacity between simulation data and measurement data in the embodiments of the present disclosure.

The specific contents of Step 6 are to compare the simulation model in Step 1 with the measurement data obtained in Step 2 to eventually verify the correctness of the proposed channel capacity calculation formula. FIG. 9 illustrates the comparison between the simulation results and the measurement results, and it can be seen that the non-stationary channel is more consistent with the measurement results. The accuracy of massive MIMO channel considering mutual coupling effect is verified, and the correctness of calculating the capacity of the non-stationary large-scale antenna array is further proved.

Provided in the present disclosure is a method for calculating the channel capacity for the non-stationary large-scale antenna array. Compared with the existing channel capacity calculation method, the non-stationarity of the channel and the mutual coupling effect of the antenna are considered in the method of the present disclosure, and the calculation result is compared with the channel measurement result, solving the problems that the previous channel capacity calculation is not applicable in the non-stationary channel. The method for calculating the capacity of the non-stationary channel provided in the present disclosure passes the measurement fitting, provides CIRs of the whole communication channel, and analyzes the spatial cross-correlation function and channel capacity of the system accordingly.

It should be understood that the present disclosure is described by some embodiments, it is known for those skilled in the art that the features and embodiments may be modified or equivalently replaced without deviating from the spirit and scope of the present disclosure. In addition, under the instructions of the present disclosure, these features and embodiments may be modified to adapt to specific situations and materials without deviating from the spirit and scope of the present disclosure. Therefore, the present disclosure is not limited by the specific embodiments disclosed herein, and all embodiments falling within the scope of the claims of the present application fall within the scope protected by the present disclosure.

What is claimed is:

1. A method for calculating a spatial non-stationary wireless channel capacity for large-scale antenna array communication, comprising:

Step 1, constructing a non-stationary channel model for a large-scale antenna array having a mutual coupling effect;

Step 2, building a channel measurement system for the large-scale antenna array, to obtain measurement data;

Step 3, optimizing simulation parameters for a channel of the large-scale antenna array, and simulating a spatial cross-correlation function;

Step 4, proposing and calculating a spatial stationary interval according to the spatial cross-correlation function;

Step 5, calculating a channel capacity within the interval and the total channel capacity according to the stationary interval; and Step 6, comparing simulation results with measurement results, to verify correctness of a capacity calculation of the non-stationary channel, wherein steps of Step 1 are specifically as follows:

Step 101, constructing a channel matrix $H=[PL \cdot SH \cdot BL \cdot OL]^{1/2} \cdot H_s$ for a non-stationary massive MIMO channel model, where PL denotes a path loss, SH denotes a shadowing that follows a lognormal distribution, BL denotes a blockage loss, and OL denotes an oxygen loss; $H_s=[h_{qp}(t,\tau)]_{M_R \times M_T}$ denotes a small-scale fading matrix, $M_R$ and $M_T$ denote the number of antennas at the receiving and transmitting terminal, respectively;

Step 102, modeling a spherical wavefront; wherein a distance $$d^T_{p,m_n}(t)$$

between the transmitting terminal and a n-th cluster through an m-th ray at time instant t is represented as:

$$d^T_{p,m_n}(t) = d^T_{m_n} - \left[l^T_p + \int_0^t v^T(t) - v^{A_n}(t)dt\right]$$

where $$l^T_p$$

denotes a length or an antenna at the transmitting terminal, $$d^T_{m_n}$$

denotes a distance vector from a first transmitting antenna to a first cluster on a n-th path through the m-th ray at an initial time, $v^T(t)$ and $v^{A_n}(t)$ denote moving speeds of the transmitting terminal and the first cluster on the n-th path at time t, respectively;

Step 103, modeling an evolution on an array axis; characterizing, by utilizing a generation and disappearance process, generations and disappearances of clusters, wherein for the transmitting terminal, a survival probability of the cluster on the array axis is calculated by a following equation:

$$P^T_{sur}(\delta_q) = \exp^{-\lambda_R \cdot \frac{\delta_q \cos \beta^T_E}{D^A_c}}$$

where $\lambda_R$ denotes a disappearance rate of the cluster, $\delta_p$ denotes a distance from a first antenna to a p-th antenna at the transmitting terminal, $$D^A_c$$

denotes a scenario-dependent coefficient in a spatial domain; similarly, a survival probability of the receiving terminal is:

$$P^R_{sur}(\delta_q) = \exp^{-\lambda_R \cdot \frac{\delta_q \cos \beta^R_E}{D^A_c}}$$

where $\delta_q$ denotes a distance from a first antenna to a q-th antenna at the receiving terminal, $$\beta^T_E \text{ and } \beta^R_E$$

denote an elevation angle of an antenna array of the transmitting terminal and an elevation angle of an antenna array of the receiving terminal respectively; therefore, a number of newly generated clusters generated by a spatial evolution is represented as:

$$E[N_{new}] = \frac{\lambda_G}{\lambda_R}(1 - P_{sur}(\delta_p, \delta_q))$$

where $\lambda_G$ denotes a generation rate of the clusters;

Step 104, modeling a mutual coupling effect between antennas; describing the mutual coupling between the antennas by utilizing an impedance matrix, obtaining a multi-port model by correlating antenna currents and antenna voltages with port currents and port voltages:

$$\begin{bmatrix} u_1 \\ u_2 \end{bmatrix} = \begin{bmatrix} Z_{11} & Z_{12} \\ Z_{21} & Z_{22} \end{bmatrix} \begin{bmatrix} i_1 \\ i_2 \end{bmatrix}$$

where $u_1$, $i_1$ denote port voltages and port currents at the transmitting terminal, respectively and $u_2$, $i_2$ denote port voltages and port currents at the receiving terminal, respectively, $Z_{11}$, $Z_{22}$ denote a transmitting impedance matrix and a receiving impedance matrix respectively, and $Z_{12}$, $Z_{21}$ denote mutual impedance matrixes;

representing, when considering a uniform linear array of isotropic antennas, a mutual coupling effect considering an input and a load impedance as:

$$c_p = (Z_G + Z_L)(Z + Z_L I)^{-1}$$

where $Z_G$ denotes an input impedance of an element in a free space, and $Z_L$ is a matched load impedance; a current vector is represented as I and a matrix Z is extended to:

$$[Z] = \begin{bmatrix} Z_G + Z_L & Z_{12} & \dots & Z_{1q} \\ Z_{12} & Z_G + Z_L & \dots & Z_{2q} \\ \vdots & \vdots & \ddots & \vdots \\ Z_{q1} & Z_{q2} & \dots & Z_G + Z_L \end{bmatrix}$$

expressing, after adding the mutual coupling effect, a channel matrix as:

$$G = c_p^{R^{-1/2}} \cdot H \cdot c_p^{T^{-1/2}}$$

where $$c_p^R \text{ and } c_p^T$$

denote a coupling matrix of the receiving terminal and a coupling matrix of the transmitting terminal respectively.

2. The method for calculating the spatial non-stationary wireless channel capacity for the large-scale antenna array communications according to claim 1, wherein $h_{qp}(t,\tau)$ denotes a CIR between a p-th transmitting antenna and a q-th receiving antenna at a time instant t with a delay $\tau$, which is represented as a superposition of LOS and NLOS components:

$$h_{qp}(t, \tau) = \sqrt{\frac{K_R}{K_R + 1}} h_{qp}^L(t, \tau) + \sqrt{\frac{1}{K_R + 1}} h_{qp}^N(t, \tau)$$

where $K_R$ denotes a rice factor, the NLOS components $$h_{qp}^N(t, \tau)$$

are calculated by a following formula:

$$h_{qp}^N(t, \tau) = \sum_{n=1}^{N_{qp}(t)} \sum_{m=1}^{M_n} F_r^T \cdot M \cdot F_t \cdot \sqrt{P_{qp,m_n}(t)} \cdot e^{j2\pi f_c \tau_{qp,m_n}(t)} \cdot \delta(\tau - \tau_{qp,m_n}(t))$$

where $\{\cdot\}^T$ denotes a transposition operator, a carrier frequency is represented as $f_c$, $P_{ap,m_n}(t)$ and $\tau_{gp,m_n}(t)$ denote a power and delay of the m-th ray from the p-th transmitting antenna to the q-th receiving antenna at the time instant t, respectively, $N_{qp}(t)$ and $M_n$ denote a total number of clusters and a total number of rays in the clusters respectively, polarization matrixes $F_r$ and $F_t$ contain a vertical polarization and a horizontal polarization of the antennas at the receiving terminal and the transmitting terminal respectively, a variation of antenna polarization along a propagation path is represented as M.

3. The method for calculating the spatial non-stationary wireless channel capacity for the large-scale antenna array communications according to claim 2, wherein steps of Step 5 are specifically as follows:

firstly, dividing the channel into n segments according to the stationary interval obtained in Step 4, and calculating the channel capacity at the i-th segment according to a stationary interval $\Delta r_i$ at an i-th segment:

$$C_{\Delta r_i} = E\left\{\log_2 \det\left(I + \frac{\rho}{M_T} G_i G_i^H\right)\right\}$$

where $G_i$ denotes a general channel matrix at the i-th segment; and eventually obtaining a total channel capacity in an entire observation interval R as follows:

$$C = \sum_{i=1}^{n} \frac{\Delta r_i}{R} C_{\Delta r_i} = \sum_{i=1}^{n} \frac{\Delta r_i}{R} \left\{\log_2 \det\left(I + \frac{\rho}{M_T} G_i G_i^H\right)\right\}.$$

4. The method for calculating the spatial non-stationary wireless channel capacity for the large-scale antenna array communications according to claim 1, wherein a relationship in spherical coordinate systems is as follows:

$$d_{m_n}^T = d_{m_n}^T \begin{bmatrix} \cos(\phi_{E,m_n}^T)\cos(\phi_{A,m_n}^T) \\ \cos(\phi_{E,m_n}^T)\sin(\phi_{A,m_n}^T) \\ \sin(\phi_{E,m_n}^T) \end{bmatrix}^T$$

$$l_p^T = \delta_p \begin{bmatrix} \cos(\beta_E^T)\cos(\beta_A^T) \\ \cos(\beta_E^T)\sin(\beta_A^T) \\ \sin(\beta_E^T) \end{bmatrix}^T$$

$$v^T(t) = v^T(t) \begin{bmatrix} \cos(\alpha_E^T(t))\cos(\alpha_A^T(t)) \\ \cos(\alpha_E^T(t))\sin(\alpha_A^T(t)) \\ \sin(\alpha_E^T(t)) \end{bmatrix}^T$$

$$v^{A_n}(t) = v^{A_n}(t) \begin{bmatrix} \cos(\alpha_E^{A_n}(t))\cos(\alpha_A^{A_n}(t)) \\ \cos(\alpha_E^{A_n}(t))\sin(\alpha_A^{A_n}(t)) \\ \sin(\alpha_E^{A_n}(t))] \end{bmatrix}^T$$

where $$\phi_{E,m_n}^T \text{ and } \phi_{A,m_n}^T$$

denote a elevation angle of departure and an azimuth angle of departure of the m-th ray in the n-th cluster, respectively, $\delta_p$ denotes the distance between the first antenna to the p-th antenna at the transmitting terminal, $$\beta_E^T \text{ and } \beta_A^T$$

denote an elevation angle and an azimuth angle of an antenna array at the transmitting terminal;

$$\alpha_E^T(t) \text{ and } \alpha_A^T(t)$$

denote an elevation angle and an azimuth angle of the moving transmitting terminal at the time instant t, respectively, $$\alpha_E^{A_n}(t) \text{ and } \alpha_A^{A_n}(t)$$

denote movable elevation angle and an azimuth angle of the first cluster on the n-th path, respectively; an approximate result of $$d_{p,m_n}^T(t)$$

is eventually obtained as follows:

$$d_{p,m_n}^T(t) \approx d_{m_n}^T - \cos(\omega_p^T)v^T t - \cos(\vartheta^T)\delta_p + \frac{\sin^2(\vartheta^T)\delta_p^2}{2d_{m_n}^T} + \frac{\sin^2(\omega_p^T)(v^T t)^2}{2[d_{m_n}^T - \cos(\vartheta^T)\delta_p]}$$

where $\vartheta^T$ denotes an angle between the transmitting antenna array and the m-th ray, and $$\omega_p^T$$

denotes an angle between a scatterer $$S_{m_n}^A$$

and the transmitting antenna, the $\vartheta^T$ and the $$\omega_p^T$$

are respectively represented as following formulas, respectively:

$$\cos(\vartheta^T) = \cos(\phi_{E,m_n}^T)\cos(\beta_E^T) \ \& \ \cos(\beta_A^T - \phi_{A,m_n}^T) + \sin(\phi_{E,m_n}^T)\sin(\beta_E^T)$$

$$\cos(\omega_p^T) = \frac{d_{m_n}^T \cos(\alpha^T - \phi_{A,m_n}^T)\cos(\phi_{E,m_n}^T) - \delta_p \cos(\alpha^T - \beta_A^T)\cos(\beta_E^T)}{\left[(d_{m_n}^T)^2 - 2d_{m_n}^T \delta_p \cos(\vartheta^T) + \delta_p^2\right]^{1/2}}$$

for the receiving terminal, the $$d_{p,m_n}^T(t), \vartheta^T, \text{ and } \omega_p^T$$

in the above formula merely need to be replaced by $$d_{q,m_n}^R(t), \vartheta^R, \text{ and } \omega_q^R,$$

respectively.

5. The method for calculating the spatial non-stationary wireless channel capacity for the large-scale antenna array communications according to claim 1, wherein steps of Step 4 are specifically as follows:

Step 401, adopting a circumstance when CSI is unknown at the transmitting terminal, the CSI is completely known at the receiving terminal and the channel matrix is random:

$$C = E\left\{\log_2 \det\left(I + \frac{\rho}{M_T} HH^H\right)\right\}$$

where ρ denotes a signal-to-noise ratio, and H denotes the channel matrix;

Step 402, defining and calculating the spatial stationary interval according to the spatial cross-correlation function;

wherein a definition of the spatial stationary interval is a maximum number of antennas where the spatial cross-correlation function of an angular power spectral density exceeds 80% of a threshold; therefore, an improvement of a stationary interval I(r) in space s is defined as:

$$I(r) = \inf\{\Delta r \mid R_\Lambda(r, \Delta r) \le 0.8\}$$

where inf{·} denotes an infimum of the function, Δr denotes a number of antennas in the spatial domain stationary interval, and $R_\Lambda(r,\Delta r)$ denotes a normalized spatial cross-correlation function of the angular power spectral density:

$$R_\Lambda(r, \Delta r) = \frac{\int \Lambda(r, \varpi)\Lambda(r, \Delta r, \varpi)d\varpi}{\max\left\{\int \Lambda^2(r, \varpi)d\varpi, \int \Lambda^2(r, \Delta r, \varpi)d\varpi\right\}}$$

where $\varpi$ denotes an angle difference.

* * * * *